No. 728,878.

Patented May 26, 1903.

UNITED STATES PATENT OFFICE.

NICHOLAS DEL GRANDE, OF PETERSBURG, VIRGINIA, ASSIGNOR TO VIRGINIA FIREWORKS CO., OF PETERSBURG, VIRGINIA.

PROCESS OF PREPARING PYROTECHNICS.

SPECIFICATION forming part of Letters Patent No. 728,878, dated May 26, 1903.

Application filed January 22, 1902. Serial No. 90,818. (No specimens.)

*To all whom it may concern:*

Be it known that I, NICHOLAS DEL GRANDE, a citizen of the United States, residing at Petersburg, in the county of Dinwiddie and State of Virginia, have invented a new and useful Process of Preparing a Compound for Pyrotechnics, of which the following is a specification.

This invention relates to a compound for use in connection with that class of pyrotechnics commercially known as "whistling-bombs." The substance heretofore employed for this purpose is picrate of potash, a chemical having the peculiar property when tightly packed in a tube and ignited of producing a sharp and shrill whistling sound.

The object of the present invention is in a simple, thoroughly practical, and feasible manner to lessen the time and labor required in the production of picrate of potash.

With these and other objects in view, as will appear as the nature of the invention is better understood, the same consists in the improved picrate of potash and method of making the same, as will be hereinafter fully described and claimed.

In carrying the invention into effect there is taken of the following ingredients, by weight: saltpeter, three parts; picric acid of commerce, one part; water in the necessary quantity.

The saltpeter and the picric acid are separately placed in suitable vessels and water added thereto, either cold, warm, or boiling, in any desired quantity, but preferably just sufficient to effect thorough dissolving of the ingredients. In any event whether the water be cold or boiling heat is applied to the vessel to bring the water to and hold it at the point of ebullition for some moments, after which the saltpeter solution is poured into and slowly mixed with the dissolved acid, both of the solutions being highly heated. The resultant compound is a flocculent mass, resembling in appearance finely-grated dairy cheese mixed with water and having a yellowish color. After the ingredients are thoroughly commingled the water is expressed therefrom in any suitable manner, after which the compound is broken up into small pieces and allowed to dry, when it is reduced to a powder or granules by being worked through a suitable sieve. The compound is then taken and forced under pressure into holders, such as paper tubes, with which is associated an igniting device in the nature of a fuse.

A peculiar property possessed by this compound over the ordinary picrate of potash is that in common with the same it will emit a shrill whistling sound when ignited if tightly packed in a holder, as above stated; but if only loosely placed therein it will explode with a violence equal to that of gunpowder. Moreover, it is more easily ignited than ordinary picrate of potash, and for that reason excessive care has to be taken that no fire is employed when the compound is manufactured, all of the operations being carried on preferably by heat from steam-coils or ovens heated by steam-coils.

Another feature peculiar to this compound is that it has marked non-hygroscopic properties, inasmuch as that after the compound is once thoroughly dried and packed in the tubes ordinary dampness in the atmosphere will not affect it, whereas the ordinary picrate of potash of commerce is hygroscopic to a degree that will render it inoperative if left for any length of time in a damp or moist atmosphere. The property of resisting entrance of moisture into the compound of the present invention is believed to be due to the fact of the large percentage of saltpeter in proportion to that of picric acid, the granules of the compound when dried being exceedingly brittle and difficult to reduce easily to a powder.

By the method of producing picrate of potash under the procedure of the present invention its cost of production is reduced to a minimum, and, further, the employment of skilled labor or of an attendant having some degree of chemical knowledge is rendered entirely unnecessary.

Having thus fully described my invention, what I claim as new, and desire to secure by Letters Patent, is—

The herein-described method of making whistling-bombs, which consists in slowly incorporating a boiling solution containing three parts by weight of saltpeter with a boiling solution containing one part by weight of picric acid, the resulting compound being a flocculent or curdy mass resembling in appearance finely-grated dairy cheese mixed with water, and having a yellowish color, then expressing the water, then drying by radiated heat, and finally reducing the mass to powder or granules.

In testimony that I claim the foregoing as my own I have hereto affixed my signature in the presence of two witnesses.

NICHOLAS DEL GRANDE.

Witnesses:
J. H. JOCHUM, Jr.,
F. S. APPLEMAN.